United States Patent
DeCarr et al.

(10) Patent No.: US 10,610,922 B2
(45) Date of Patent: Apr. 7, 2020

(54) CERAMIC SLURRY COMPOSITIONS AND METHODS OF USE THEREOF

(71) Applicant: General Electric Company, Schenectady, NY (US)

(72) Inventors: Sylvia Marie DeCarr, Greer, SC (US); Kimberly Ann Polishchuk, Niskayuna, NY (US); John Patrick Pollinger, Niskayuna, NY (US); Stephanie Lynn Knoeller, Greenwich, NY (US); Joan McKiever, Ballston Lake, NY (US)

(73) Assignee: General Electric Company, Schenectady, NY (US)

( * ) Notice: Subject to any disclaimer, the term of this patent is extended or adjusted under 35 U.S.C. 154(b) by 354 days.

(21) Appl. No.: 15/699,628

(22) Filed: Sep. 8, 2017

(65) Prior Publication Data

US 2019/0076914 A1  Mar. 14, 2019

(51) Int. Cl.
| | | |
|---|---|---|
| *B22C 1/08* | (2006.01) | |
| *B22C 9/10* | (2006.01) | |
| *C04B 35/14* | (2006.01) | |
| *C09C 1/30* | (2006.01) | |
| *C04B 35/634* | (2006.01) | |

(Continued)

(52) U.S. Cl.
CPC ............... *B22C 1/08* (2013.01); *B22C 9/10* (2013.01); *C04B 35/14* (2013.01); *C04B 35/6263* (2013.01); *C04B 35/6269* (2013.01); *C04B 35/62625* (2013.01); *C04B 35/6303* (2013.01); *C04B 35/6316* (2013.01); *C04B 35/63448* (2013.01); *C09C 1/30* (2013.01); *C01P 2004/61* (2013.01); *C04B 2235/3201* (2013.01); *C04B 2235/3205* (2013.01); *C04B 2235/3213* (2013.01); *C04B 2235/3217* (2013.01); *C04B 2235/3248* (2013.01); *C04B 2235/3418* (2013.01); *C04B 2235/408* (2013.01); *C04B 2235/44* (2013.01); *C04B 2235/442* (2013.01); *C04B 2235/443* (2013.01); *C04B 2235/528* (2013.01); *C04B 2235/5436* (2013.01);

(Continued)

(58) Field of Classification Search
CPC .. B22C 1/08; B22C 9/10; C04B 35/14; C04B 2235/408
USPC .... 164/15, 520, 525, 528, 369; 501/94, 133; 106/38.2, 38.9
See application file for complete search history.

(56) References Cited

U.S. PATENT DOCUMENTS

| 4,139,393 A | 2/1979 | Chandhok |
|---|---|---|
| 4,235,617 A | 11/1980 | Rao |

(Continued)

*Primary Examiner* — Kevin P Kerns
(74) *Attorney, Agent, or Firm* — Armstrong Teasdale LLP

(57) ABSTRACT

A slurry composition includes, by volume, a ceramic composition in an amount of from about 60 to about 75 percent and a binder in an amount of from about 25 to about 40 percent, plus a platinum group metal catalyst and a dopant. The ceramic composition includes, by volume of the ceramic composition, fine fused silica particles having a particle size $d_{50}$ of from about 4 µm to about 7 µm, in an amount of from about 7 to about 40 percent; coarse fused silica particles having a $d_{50}$ of from about 25 µm to about 33 µm, in an amount of from about 29 to about 60 percent; inert filler particles having a $d_{50}$ of from about 5 µm to about 25 µm, in an amount of from about 8 to about 40 percent; and fumed silica particles, in an amount of up to about 15 percent.

25 Claims, 1 Drawing Sheet

(51) Int. Cl.
*C04B 35/626* (2006.01)
*C04B 35/63* (2006.01)

(52) U.S. Cl.
CPC .............. *C04B 2235/5472* (2013.01); *C04B 2235/6028* (2013.01); *C04B 2235/725* (2013.01)

(56) References Cited

U.S. PATENT DOCUMENTS

| | | |
|---|---|---|
| 4,240,828 A | 12/1980 | Huseby |
| 5,308,556 A | 5/1994 | Bagley |
| 5,643,844 A | 7/1997 | Yasrebi et al. |
| 6,403,018 B1 | 6/2002 | Goretta et al. |
| 7,048,034 B2 * | 5/2006 | Vandermeer et al. ........................ B22C 7/023 164/361 |
| 7,487,819 B2 | 2/2009 | Wang et al. |
| 8,575,513 B2 | 11/2013 | Abdo et al. |
| 2008/0210844 A1 * | 9/2008 | Nycz et al. ............ B22C 1/183 249/134 |
| 2010/0025001 A1 | 2/2010 | Lee et al. |
| 2013/0307201 A1 | 11/2013 | McEnerney |
| 2015/0183026 A1 | 7/2015 | Tyron et al. |

* cited by examiner

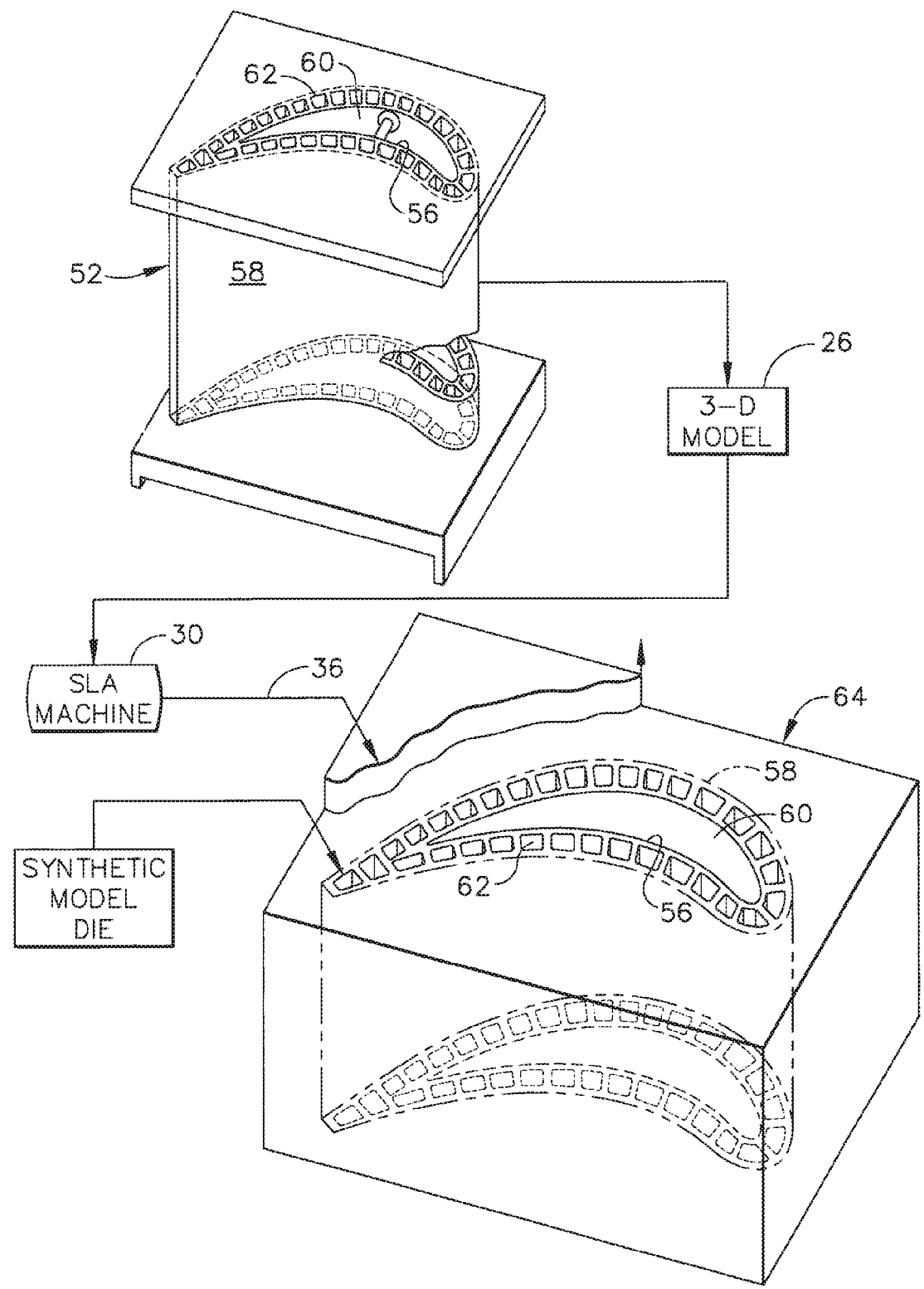

CERAMIC SLURRY COMPOSITIONS AND METHODS OF USE THEREOF

BACKGROUND

The field of the disclosure relates generally to ceramic slurry compositions, and more particularly to slurry compositions that include particle size and/or shape distributions that reduce total and differential shrinkage during a process of forming a ceramic article from the composition.

It is desirable to form at least some ceramic articles in a process that avoids shrinkage during firing of the ceramic article or during subsequent use of the article. For example, at least some metal components are formed in a casting process around a ceramic core, and it is desirable for cores to have low process shrinkages during firing of the core and/or casting of the component, typically 1.5 percent or less, to meet tight dimensional specifications for the finished metal component. Furthermore, it is desirable to reduce core cracking, which may be due to differential shrinkage between thick and thin sections in the core during firing and/or casting. Modifications, such as hollowing out thick sections in the starting die used to form the ceramic article, may be used to mitigate this shrinkage mismatch. However, such modifications require undesirable additional processing steps.

Reduction in total and differential shrinkage of the ceramic article is typically achieved by crystallization of amorphous silica during firing. The formation of the crystalline phase results in reduced viscous sintering of the silica amorphous phase. In addition, a threshold amount of crystalline silica phase (e.g., cristobalite, quartz, etc.) is required, for example, prior to casting in order to achieve subsequent cast metal blade dimensional tolerances.

One approach to inducing cristobalite formation is to include a dopant (i.e., a flux) in the slurry, which allows for formation of adequate cristobalite levels prior to use in, for example, investment casting of metal. Another approach is to use higher solids loading in the slurry. The higher solids loading may be used instead of, or in conjunction with, the use of a dopant. Higher solids loading also results in increased ceramic article strength. However, increasing higher solids loading of the slurry results in an increased viscosity of the slurry, which can cause damage to, for example, polymer-based core dies.

BRIEF DESCRIPTION

In one embodiment, a slurry composition is provided. The slurry composition includes a ceramic composition in an amount of from about 60 to about 75 percent by volume of the slurry composition, a binder in an amount of from about 25 to about 40 percent by volume of the slurry composition, a platinum group metal catalyst, and a dopant. The ceramic composition includes fine fused silica particles having a particle size $d_{50}$ of from about 4 μm to about 7 μm, in an amount of from about 7 to about 40 percent by volume of the ceramic composition; coarse fused silica particles having a $d_{50}$ of from about 25 μm to about 33 μm, in an amount of from about 29 to about 60 percent by volume of the ceramic composition; inert filler particles having a $d_{50}$ of from about 5 μm to about 25 μm, in an amount of from about 8 to about 40 percent by volume of the ceramic composition; and fumed silica particles, in an amount of up to about 15 percent by volume of the ceramic composition.

In another embodiment, a method for making a ceramic casting core for a hollow component is provided. The method includes providing a slurry composition that includes a ceramic composition in an amount of from about 60 to about 75 percent by volume of the slurry composition, a binder in an amount of from about 25 to about 40 percent by volume of the slurry composition, a platinum group metal catalyst, and a dopant. The ceramic composition includes fine fused silica particles having a particle size $d_{50}$ of from about 4 μm to about 7 μm, in an amount of from about 7 to about 40 percent by volume of the ceramic composition; coarse fused silica particles having a $d_{50}$ of from about 25 μm to about 33 μm, in an amount of from about 29 to about 60 percent by volume of the ceramic composition; inert filler particles having a $d_{50}$ of from about 5 μm to about 25 μm, in an amount of from about 8 to about 40 percent by volume of the ceramic composition; and fumed silica particles, in an amount of up to about 15 percent by volume of the ceramic composition. The method also includes curing the slurry composition to form the ceramic casting core.

DRAWINGS

FIG. 1 is a schematic representation of a hollow metal component and a corresponding synthetic core die that may be used in forming the metal component.

DETAILED DESCRIPTION

The exemplary embodiments described herein provide ceramic slurry compositions having particle size distributions that include both fine and coarse fused silica particles. Some embodiments further include particle shape distributions that include spherical fused silica particles. The embodiments provide several advantageous properties, such as, but not limited to, reduced total and differential shrinkage during formation of a ceramic article from the composition, improved core strength, and higher solids loading of the slurry while maintaining compatibility with slurry injection into, for example, a polymer-based 3-D die.

At least some embodiments of the compositions and methods described herein are useful in a Disposable Core Die (DCD) process. To overcome limitations in designing complex cooling passageways required for certain metal components, such as next generation turbine blades, General Electric Company developed the DCD process which uses existing rapid prototyping (RP) technology to print a polymer-based (3-D) die instead of using a traditional (2.5-D) steel die to produce a ceramic core. The DCD process is disclosed, for example, in U.S. Pat. Nos. 7,413,001, 7,287,573, and 7,487,819. In the DCD process, a silicone-binder based ceramic slurry is injected into the polymer-based 3-D die using low pressures, and the slurry cures and hardens. Next, the whole part is placed into a furnace where the die is pyrolized and the core sinters. The resultant composition of the ceramic core is similar to that used in the traditional process, and thus the core can be leached out using a standard process. The DCD process has numerous utilities, for example, enabling the production of complex 3-D cores, which in turn enables production by investment casting of, for example, metal turbine blades that can meet efficiency targets by reducing the amount of cooling air required to cool the blades. Additionally or alternatively, at least some embodiments of the compositions and methods described herein are useful in any other suitable application which involves ceramic articles.

In the following specification and the claims which follow, reference will be made to a number of terms, which shall be defined to have the following meanings.

The singular forms "a", "an", and "the" include plural references unless the context clearly dictates otherwise.

"Optional" or "optionally" means that the subsequently described event or circumstance may or may not occur, and that the description includes instances where the event occurs and instances where it does not.

Approximating language, as used herein throughout the specification and claims, may be applied to modify any quantitative representation that could permissibly vary without resulting in a change in the basic function to which it is related. Accordingly, a value modified by a term or terms such as "about," "approximately," and "substantially" is not to be limited to the precise value specified. In at least some instances, the approximating language may correspond to the precision of an instrument for measuring the value. Here and throughout the specification and claims, range limitations may be identified. Such ranges may be combined and/or interchanged, and include all the sub-ranges contained therein unless context or language indicates otherwise.

As used herein, the term "fine fused silica particles" has the meaning of fused silica (i.e., noncrystalline (glass) form of silicon dioxide) particles having a $d_{50}$ of from about 4 μm to about 7 μm. Fine fused silica particles may be spherical or angular in shape. In one embodiment, the fine fused silica particles are a combination of spherical shaped particles and angular shaped particles.

As used herein, the term "coarse fused silica particles" has the meaning of fused silica particles having a $d_{50}$ of from about 25 μm to about 33 μm. Coarse fused silica particles may be spherical or angular in shape. In one embodiment, the coarse fused silica particles are a combination of spherical shaped particles and angular shaped particles.

As used herein, the term "inert filler particles" has the meaning of particles that are not reactive in the slurry composition. Inert filler particles may be zircon particles, aluminum oxide particles, quartz particles, and mixtures thereof.

As used herein, the term "fumed silica particles" has the meaning of particles of fumed silica, also known as pyrogenic silica, which is made up of microscopic droplets of amorphous silica fused into branched, chainlike, three-dimensional secondary particles which then agglomerate into tertiary particles. The resulting powder has an extremely low bulk density and high surface area. Its three-dimensional structure results in viscosity-increasing, thixotropic behavior when used as a thickener or reinforcing filler. Fumed silica particles function in the slurry composition as a rheology modifier.

As used herein, the term "platinum group metal catalyst" has the meaning of a catalyst containing ruthenium, rhodium, palladium, osmium, iridium, and/or platinum. Platinum group metal catalyst can be selected from such catalysts that are conventional and well known in the art. Suitable platinum group metal catalysts include, but are not intended to be limited to, the Pt divinylsiloxane complexes as described in U.S. Pat. Nos. 3,715,334 and 3,775,452; Pt-octyl alcohol reaction products as disclosed in U.S. Pat. No. 3,220,972; the Pt-vinylcyclosiloxane compounds disclosed in U.S. Pat. No. 3,516,946; and Pt-olefin complexes disclosed in U.S. Pat. Nos. 4,288,345 and 4,421,903. Platinum group metal catalyst enables curing reaction of siloxane binder and produces green strength.

As used herein, the term "dopant" has the meaning of composition that induces formation of crystalline cristobalite in the slurry composition during firing. The dopant may be a cation (e.g., Na+) or a compound (e.g., sodium carbonate). In some embodiments, the dopant is selected to be compatible with the RP die and the siloxane binder system. The dopant may be added to the slurry composition, for example, as a salt (e.g., carbonate salt), a silica-based glass frits containing alkali metal cation and/or alkaline earth metal cation, in a colloidal dispersion, or as an aqueous salt suspension. In one embodiment, the dopant is provided as a coating on the fine fused silica particles, the coarse fused silica particles, or both the fine fused silica particles and the coarse fused silica particles, wherein the dopant is an alkali metal cation, an alkaline earth metal cation, or a combination of an alkali metal cation and an alkaline earth metal cation. For example, sodium hydroxide solution can be mixed with the fine fused silica particles and then dried, leaving sodium cation on the surface of the fine fused silica particles. For another example, sodium cation is deposited in a similar fashion on the surface of the coarse fused silica particles.

As used herein, the term "binder" has the meaning of a cohesive substance. For example, silicone binders are disclosed in U.S. Pat. Nos. 7,732,526 and 7,287,573. Binder serves as a liquid vehicle for ceramic powders and provides strength in cured state. An additional benefit of the siloxane binder is that a significant fraction is converted to silica in the sintered part. Some examples of suitable binders include 1,3,5,7-tetravinyltetramethylcyclotetrasiloxane, methylhydrogenpolysiloxane, and mixtures thereof.

As used herein, the term "dispersant" has the meaning of an additive to a chemical dispersion which is capable of maintaining the dispersed particles in suspension.

As used herein, the term "$d_{50}$" has the meaning of a median diameter of a plurality of particles. $d_{50}$ can be measured by laser light scattering techniques, e.g., with MICROTRAC S3500 laser diffraction analyzer. The entire particle size distribution data from MICROTRAC S3500 laser diffraction analyzer is fed into a particle packing model which calculates $d_{50}$ of the particles.

As used herein, the term "spherical" has the meaning of a shape of a particle having a sphericity value of approximately greater than 0.8-0.9. Determination of the shape of particles may be performed using image analysis of scanning electron micrographs. As used herein, particles that are not spherical are considered to have an angular shape.

As used herein, the term "alkali metal" has the meaning of Periodic Table of Elements Group 1 metal. Alkali metal, as used herein, includes lithium, sodium, potassium, rubidium, cesium, francium, and combinations thereof. Thus, for example, an alkali metal may be a combination of sodium and potassium.

As used herein, the term "alkaline earth metal" has the meaning of Periodic Table of Elements Group 2 metal. Alkaline earth metal, as used herein, includes beryllium, magnesium, calcium, strontium, barium, radium, and combinations thereof. Thus, for example, an alkaline earth metal may be a combination of strontium and barium.

As used herein, the term "alkali metal cation source" has the meaning of a compound that includes an alkali metal. Examples of alkali metal cation sources are alkali metal borate, alkali metal carbonate, alkali metal oxide, alkali metal hydroxide, alkali metal silicate, alkali metal nitrate, and combinations thereof. For example, an alkali metal cation source may be sodium tetraborate, sodium carbonate, sodium silicate, sodium hydroxide, sodium nitrate, and combinations thereof.

As used herein, the term "alkaline earth metal cation source" has the meaning of a compound that includes an alkaline earth metal. Examples of alkaline earth metal cation sources are alkaline earth metal carbonate, alkaline earth metal oxide, alkaline earth metal silicate, alkaline earth metal nitrate, and combinations thereof. For example, an alkaline earth metal cation source may be magnesium oxide, barium carbonate, calcium carbonate, strontium carbonate, and combinations thereof.

As used herein, the term "alkali metal cation" has the meaning of a cation of an alkali metal. An example of an alkali metal cation is a sodium cation, which may be coated on the surfaces of the fine fused silica particles and/or the coarse fused silica particles.

As used herein, the term "alkaline earth metal cation" has the meaning of a cation of an alkaline earth metal. An example of an alkaline earth metal cation is a magnesium cation, which may be coated on the surfaces of the fine fused silica particles and/or the coarse fused silica particles.

Embodiments of the compositions and methods for forming ceramic articles are described below in the context of forming a ceramic core for use in an investment casting process of a metal component. However, the embodiments are useful in the context of forming many other suitable ceramic articles, and are not limited solely to use in forming ceramic cores for use in an investment casting process of a metal component.

FIG. 1 is a schematic representation of a hollow metal component 52 and a corresponding sacrificial die 64 that may be used in forming metal component 52. In the exemplary embodiment, component 52 is a turbine nozzle vane. In alternative embodiments, component 52 is any metal component, for use in any application, that may be suitably formed using a ceramic core formed from the slurry compositions described herein. In the exemplary embodiment, component 52 includes an external wall 58 and at least one internal wall 56 disposed in a spaced-apart relationship with external wall 58.

In the exemplary embodiment, sacrificial die 64 is a single-piece or monolithic sacrificial (3-D) die, as opposed to a conventional two-piece (2.5-D) die. More specifically, conventional 2.5-D dies enable non-destructive separation of the die pieces from the ceramic core formed therein, enabling such dies to be used repeatedly to form multiple cores. However, for at least some components 52, a complicated geometry of internal cooling circuits makes the use of dies having two pieces very difficult and often impossible, requiring in conventional methods additional time and effort for multiple injected cores to be formed and assembled into a composite core. In alternative embodiments, sacrificial die 64 includes any suitable number of pieces that enable sacrificial die 64 to function as described herein.

In the exemplary embodiment, sacrificial die 64 defines at least one internal cavity 60, 62. As used hereinafter, the singular term cavity will be used to refer to the at least one cavity or channel within the die, but it should be understood that the use of the singular term cavity also refers to the case where more than one cavity is contained within the die. The shape of the cavity corresponds to the shape desired for the complex mold core to be used in casting component 52.

In certain embodiments, sacrificial die 64 is formed via one or more additive layer manufacturing processes, in which a computer aided design (CAD) model 26 of component 52 is sliced into a series of thin, parallel layers, such that a corresponding distribution of material within each sequential layer of sacrificial die 64 is defined. A computer numerically controlled (CNC) machine 30 deposits successive layers of material in accordance with the slices of CAD model 26 to form sacrificial die 64. For example, CNC machine 30 is a stereolithography (SLA) machine, in which a robotic arm holds a laser (not shown), and the arm precisely guides the motion of the laser along a motion path for each layer as described by the sliced CAD file. The laser directs highly focused radiation upon a curable material medium, such as a liquid resin 36, which is instantly solidified (cured) upon exposure to the laser, thereby creating a single, precisely rendered cross-sectional layer of sacrificial die 64 that corresponds with the slice of the partitioned CAD file. This procedure is repeated for all subsequent layers, with each layer being bonded to the previous one by the action of the solidifying material medium. In alternative embodiments, CNC machine 30 implements any other suitable additive manufacturing technique that enables sacrificial die 64 to function as described herein, such as, but not limited to, micro-pen deposition, where liquid media is dispensed with high precision at the pen tip and then cured; selective laser sintering, where a laser is used to sinter a powder media in precisely controlled locations; laser wire deposition, where a wire feedstock is melted by a laser and then deposited and solidified in precise locations to build the product; and fused deposition by extrusion of thin ABS plastic wire in multiple layers to build the product.

In the exemplary embodiment, the sacrificial material used to form sacrificial die 64 is one of an epoxy, a silicone, and a metal. In alternative embodiments, the sacrificial material is any suitable material that enables sacrificial die 64 to function as described herein.

The nature of the additive layer process allows single-piece or unitary articles of high internal complexity, such as, for example, closed internal chambers and tortuous internal channels, to be easily assembled in one continuous operation. Therefore, additive layer manufacturing processes are well suited to the creation of a complicated single-piece die as used in some embodiments of the present disclosure, because such a die will often be designed to have a complicated internal structure that corresponds to the complex internal cooling circuits of the component desired to be cast.

A ceramic slurry is introduced into cavity 60, 62 of sacrificial die 64. The slurry includes a ceramic powder and a liquid phase or carrier fluid, such as a binder. In some embodiments, the ceramic slurry is introduced into the cavity of sacrificial die 64 under pressure to ensure that the slurry completely fills the cavity. Injection molding is an example of a suitable method for introducing the slurry into the die cavity, because the quantity and pressure of the slurry may be precisely controlled as the slurry fills the die cavity. In some embodiments, the slurry is formed with a viscosity that is sufficiently low to facilitate introduction of the slurry into, and proper filling of, the die cavity while avoiding distortion or other damage to sacrificial die 64. As discussed above, a high viscosity of the slurry can cause damage to sacrificial die 64.

After the slurry has completely filled the die cavity, the slurry is cured to form a ceramic article, such as a ceramic core in the exemplary embodiment. Curing the slurry is done, in one example (see for example U.S. Pat. No. 7,287,573), by crosslinking/polymerizing the silicone binder monomers/oligomers using a metal catalyst and heating the ceramic slurry-filled die. Sacrificial die 64 is then removed from around the ceramic core contained in the die cavity. In certain embodiments, sacrificial die 64 is a single piece enveloping the core, and cannot be removed without being destroyed, hence the die is sacrificial in the casting method. Sacrificial die 64 is exposed to an environment, such as, for example, mechanical stress, temperature, chemicals, and combinations thereof, that is adapted to destroy sacrificial die 64 while leaving the ceramic core intact. For example, sacrificial die 64 is heated to a temperature that causes the die to decompose or burn away, dissolved in a solvent, or removed via reaction with an acid or base, while the ceramic core remains unaffected.

After removing the die, a freestanding, one-piece or monolithic ceramic core remains, suitable for use in investment casting of multi-wall component 52. The core is typically fired to provide the core with sufficient strength to survive subsequent operations. For example, the core may be fired at a temperature in the range from about 870° C. to about 1100° C. The core is then used in a suitable investment casting process to form component 52.

More specifically, the ceramic core is positioned with respect to a mold that is appropriately shaped in accordance with the shape of component 52, such as by using appropriate ancillary material known to those skilled in the art (such as positioning and support pins, sprues, gates, etc.). Wax is injected into the mold and solidified to form a wax model, and the wax model with the ceramic core embedded therein is repeatedly dipped in ceramic slurry to form a ceramic shell mold around the wax pattern. After removing the wax, the ceramic core remains disposed in and attached to the ceramic shell mold, thereby forming a shell mold-core assembly. Molten metal is introduced into the shell mold-core assembly to cast component 52. After the molten metal solidifies, the ceramic mold is removed by chemical or mechanical means, and the ceramic core is, for example, leached out of the component by a chemical removal agent.

Further details of the methods discussed above are provided in U.S. Pat. No. 7,413,001, which is incorporated by reference herein in its entirety.

As discussed above, it is desirable to form at least some ceramic articles in a process that avoids shrinkage during firing of the ceramic article or during subsequent use of the article. For example, in the investment casting context discussed above, shrinkage in the ceramic core during firing and/or casting reduces an ability to meet dimensional tolerances for component 52 and/or increases a potential for cracks to form in the ceramic core. In controlling shrinkage of the ceramic article during firing, there are two competing mechanisms: (1) viscous sintering of the silica glass, resulting in high shrinkage; and (2) transformation of the silica glass into crystalline silica (i.e. cristobalite, quartz, etc.), which reduces or arrests shrinkage. In order to form adequate cristobalite content (greater than about 50 wt % of the total silica) at the required low process temperatures (less than about 1200° C.), dopants are often added to the composition. Dopants act to lower the viscosity of the silica glass such that nucleation and crystallization occur in a reasonable time. These dopants, often alkali or alkaline earth cation-based, or combinations of the two, also promote more viscous sintering of the glass since they are known glass structure modifiers which act to lower the viscosity of the glass.

Embodiments of the slurry composition described herein, for use in a method such as the one described above, include a ceramic composition in an amount of from about 60 to about 75 percent by volume of the slurry composition, and a binder in an amount of from about 25 to about 40 percent by volume of the slurry composition. In some embodiments, the binder is selected from the group consisting of 1,3,5,7-tetravinyltetramethylcyclotetrasiloxane, methylhydrogenpolysiloxane, and combinations thereof. In alternative embodiments, the binder is any suitable binder that enables the slurry composition to function as described herein.

In the exemplary embodiment, the ceramic composition includes coarse fused silica particles having a $d_{50}$ of from about 25 μm to about 33 μm, in an amount of from about 29 to about 60 percent by volume of the ceramic composition. The ceramic composition further includes fine fused silica particles having a $d_{50}$ of from about 4 μm to about 7 μm, in an amount of from about 7 to about 40 percent by volume of the ceramic composition, inert filler particles having a $d_{50}$ of from about 5 μm to about 25 μm, in an amount of from about 8 to about 40 percent by volume of the ceramic composition, and fumed silica particles, in an amount of up to about 15 percent by volume of the ceramic composition. In contrast to known ceramic compositions used in methods such as the one described above, which tend to include at most only insignificant volumes of coarse fused silica particles, the inclusion of coarse fused silica particles in an amount of from about 29 to about 60 percent by volume result in a significantly reduced shrinkage, including reduced differential shrinkage and thus reduced cracking, of the ceramic article during firing and/or casting.

In some embodiments, the inert filler particles are selected from the group consisting of zircon particles, aluminum oxide particles, quartz particles, and mixtures thereof. In alternative embodiments, the inert filler particles are of any suitable material that enables the slurry composition to function as described herein.

Embodiments of the slurry composition described herein further include a platinum group metal catalyst. For example, in some embodiments, the platinum group metal catalyst is in an amount of from about 0.0035 to about 0.0075 percent by weight of the slurry composition. In alternative embodiments, the platinum group metal catalyst is in any suitable amount that enables the slurry composition to function as described herein.

Embodiments of the slurry composition described herein also include a dopant. The dopant typically includes an alkali metal and/or an alkaline earth metal, which reduces the viscosity of the silica glass in the slurry composition such that the kinetics for crystallization of the silica glass are enhanced and occur at the temperature of interest, and the amount of crystalline phase produced during firing is adequate to prevent unwanted shrinkage before and during the casting process. The alkali metals are typically more effective in lowering the viscosity of the silica glass compared to the alkaline earth metals, but may cause excess shrinkage until sufficient crystallization occurs. The alkaline earth metals may be added to help off-set such shrinkage by having less impact on the glass viscosity. In some embodiments, the dopant is in an amount of from about 0.075 to about 2.000 percent by weight of the ceramic composition. In alternative embodiments, the dopant is in any suitable amount that enables the slurry composition to function as described herein.

In certain embodiments, the dopant is an alkali metal cation source, an alkaline earth metal cation source, or a combination of an alkali metal cation source and an alkaline earth metal cation source. In some embodiments, the alkali metal cation source is selected from the group consisting of alkali metal borate, alkali metal carbonate, alkali metal oxide, alkali metal hydroxide, alkali metal silicate, alkali metal nitrate, and combinations thereof. For example, the dopant is selected from a group which includes sodium tetraborate, sodium carbonate, sodium silicate, sodium hydroxide, sodium nitrate, and combinations thereof. In some embodiments, the alkaline earth metal cation source is selected from the group consisting of alkaline earth metal carbonate, alkaline earth metal oxide, alkaline earth metal silicate, alkaline earth metal nitrate, and combinations thereof. For example, the dopant is selected from the group consisting of magnesium oxide, barium carbonate, calcium carbonate, strontium carbonate, and combinations thereof.

In some embodiments, the dopant is an alkali metal cation, an alkaline earth metal cation, or a combination of an alkali metal cation and an alkaline earth metal cation. In alternative embodiments, the dopant is in any suitable dopant that enables the slurry composition to function as described herein.

In one embodiment, the dopant is in a form of a powder. In another embodiment, the fine fused silica particles, the coarse fused silica particles, or both the fine fused silica particles and the coarse fused silica particles have a coating which includes the dopant, wherein the dopant is an alkali metal cation, an alkaline earth metal cation, or a combination of an alkali metal cation and an alkaline earth metal cation. In alternative embodiments, the dopant is in any suitable form that enables the slurry composition to function as described herein.

Moreover, in some embodiments, the slurry composition achieves the advantages described above using dopants that are non-boron compositions, i.e., that do not include boron. Dopants including boron, such as sodium tetraborate or other alkali metal or alkaline earth metal borates, can be an effective dopant for the formation of adequate cristobalite at temperatures below about 1200° C., as the boron further lowers silica viscosity and enhances crystallization beyond the effects of the alkali metal or alkaline earth metal cations. However, in some investment casting processes, the boron can be deleterious to the metal alloy used to cast component 52. Non-boron dopants, such as sodium carbonate, sodium silicate, sodium hydroxide, sodium nitrate, and combinations thereof, are effective in combination with the particle packing design and/or the use of spherical particles as described herein to produce ceramic cores that experience total shrinkage of less than 1.5 percent during firing and casting, while improving core yields by over 30 percent due to decreased cracking. In alternative embodiments, boron-based dopants such as sodium tetraborate are used with no deleterious effects on the cast metal component.

In certain embodiments, the slurry composition further includes a dispersant. For example, the dispersant may be selected from the group consisting of oleic acid, oleylamine, and combinations thereof. In alternative embodiments, the dispersant is any suitable dispersant that enables the slurry composition to function as described herein.

In some embodiments, a combined volume of the fine fused silica particles and the coarse fused silica particles includes at least 80 percent spherical particles. Moreover, in some such embodiments, the combined volume of the fine fused silica particles and the coarse fused silica particles includes at least 95 percent spherical particles.

In certain embodiments, substantially all of the coarse fused silica particles are spherical. In other embodiments, substantially all of the fine fused silica particles are spherical. In yet other embodiments, substantially all of both the fine fused silica particles and the coarse fused silica particles are spherical. In some such embodiments, the use of at least 80 percent spherical-shaped particles among the combined volume of fine fused silica particles and coarse fused silica particles achieves lower slurry viscosities while retaining packing densities, as compared to slurries with equivalent $d_{50}$ size distributions in which more than 20 percent of the particles have an angular shape. Thus, the spherical particles reduce core shrinkage, improve core strength, and facilitate the injection of a high-solids-load slurry composition into sacrificial die 64 without significant distortion or other damage to sacrificial die 64.

For example, in one embodiment, a slurry composition includes about 30 percent by volume of a binder, and about 70 percent by volume of a ceramic composition. The binder is a combination of about three parts 1,3,5,7-Tetravinyltetramethylcyclotetrasiloxane to four parts Methylhydrogenpolysiloxane. The ceramic composition includes, by volume, about 14 percent fine fused silica particles of substantially spherical shape, about 53 percent coarse fused silica particles of substantially spherical shape, about 30 percent inert filler particles (zircon), and about 1.5 percent fumed silica particles. Strontium carbonate powder at about 1.5 percent of the weight of the ceramic composition is used as a non-boron dopant, and platinum is used as the catalyst. The resulting slurry composition has a viscosity of less than 20 poise, and a ceramic article cast from the slurry composition in a sacrificial die and fired demonstrates a linear shrinkage of less than 1.5 percent.

Embodiments of the slurry composition described herein include a particle packing design including coarse fused silica particles, and in some embodiments a use of spherical particles, that provide advantages over at least some known ceramic compositions. Specifically, use of embodiments of the slurry composition to form a ceramic article results in a significantly reduced shrinkage, including reduced differential shrinkage and thus reduced cracking, of the ceramic article during firing and/or subsequent use, such as for casting of a metal component. Also specifically, the embodiments enable significant reduction of the viscosity of the slurry composition in combination with increased solids loading of the slurry composition, which results in, for example, fewer bulge/fill defects in a sacrificial core die injected with the slurry composition, and in increased strength of the fired ceramic article.

An exemplary technical effect of the methods, systems, and apparatus described herein includes at least one of: (a) reduced shrinkage of a ceramic article during firing and/or during use of the article for casting of a metal component, which results in tighter dimensional tolerances for the metal component; (b) reduced differential shrinkage of thicker and thinner portions of a ceramic article during firing, resulting in reduced cracking and higher ceramic article yield; and (c) significant reduction of the viscosity of the slurry composition in combination with increased solids loading of the slurry composition, which results in fewer bulge/fill defects in a sacrificial core die injected with the slurry composition and increased strength of a ceramic article.

Exemplary embodiments of slurry compositions for use in forming ceramic articles are described above in detail. The slurry compositions, and of using such slurry compositions, are not limited to the specific embodiments described herein, but rather, components of compositions and/or steps of the methods may be utilized independently and separately from other components and/or steps described herein. For example, the exemplary embodiments can be implemented and utilized in connection with many other applications that are currently configured to use ceramic articles formed from slurry compositions.

Although specific features of various embodiments of the disclosure may be shown in some drawings and not in others, this is for convenience only. In accordance with the principles of the disclosure, any feature of a drawing may be referenced and/or claimed in combination with any feature of any other drawing.

This written description uses examples to disclose the embodiments, including the best mode, and also to enable any person skilled in the art to practice the embodiments, including making and using any devices or systems and performing any incorporated methods. The patentable scope of the disclosure is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal language of the claims.

What is claimed is:

1. A slurry composition comprising:
a ceramic composition in an amount of from about 60 to about 75 percent by volume of the slurry composition;
a binder in an amount of from about 25 to about 40 percent by volume of the slurry composition;
a platinum group metal catalyst; and
a dopant;
wherein the ceramic composition comprises:
fine fused silica particles having a $d_{50}$ of from about 4 μm to about 7 μm, in an amount of from about 7 to about 40 percent by volume of the ceramic composition;
coarse fused silica particles having a $d_{50}$ of from about 25 μm to about 33 μm, in an amount of from about 29 to about 60 percent by volume of the ceramic composition;
inert filler particles having a $d_{50}$ of from about 5 μm to about 25 μm, in an amount of from about 8 to about 40 percent by volume of the ceramic composition; and
fumed silica particles, in an amount of up to about 15 percent by volume of the ceramic composition.

2. The slurry composition of claim 1, wherein the platinum group metal catalyst is in an amount of from about 0.0035 to about 0.0075 percent by weight of the slurry composition.

3. The slurry composition of claim 1, wherein the dopant is in an amount of from about 0.075 to about 2.000 percent by weight of the ceramic composition.

4. The slurry composition of claim 1, further comprising a dispersant.

5. The slurry composition of claim 1, wherein a combined volume of the fine fused silica particles and the coarse fused silica particles comprises at least 80 percent spherical particles.

6. The slurry composition of claim 1, wherein a combined volume of the fine fused silica particles and the coarse fused silica particles comprises at least 95 percent spherical particles.

7. The slurry composition of claim 1, wherein the inert filler particles are selected from the group consisting of zircon particles, aluminum oxide particles, quartz particles, and mixtures thereof.

8. The slurry composition of claim 1, wherein the binder comprises 1,3,5,7-tetravinyltetramethylcyclotetrasiloxane, methylhydrogenpolysiloxane, or a combination thereof.

9. The slurry composition of claim 1, wherein the dopant comprises an alkali metal cation source, an alkaline earth metal cation source, or a combination thereof.

10. The slurry composition of claim 1, wherein the dopant comprises an alkali metal borate, an alkali metal carbonate, an alkali metal oxide, an alkali metal silicate, an alkali metal hydroxide, an alkali metal nitrate, an alkaline earth metal carbonate, an alkaline earth metal oxide, an alkaline earth metal silicate, an alkaline earth metal nitrate, or a combination thereof.

11. The slurry composition of claim 1, wherein the dopant is a non-boron composition.

12. A method for making a ceramic casting core for a hollow component, comprising:
providing a slurry composition, wherein the slurry composition comprises:
a ceramic composition in an amount of from about 60 to about 75 percent by volume of the slurry composition;
a binder in an amount of from about 25 to about 40 percent by volume of the slurry composition;
a platinum group metal catalyst; and
a dopant;
wherein the ceramic composition comprises:
fine fused silica particles having a $d_{50}$ of from about 4 μm to about 7 μm, in an amount of from about 7 to about 40 percent by volume of the ceramic composition;
coarse fused silica particles having a $d_{50}$ of from about 25 μm to about 33 μm, in an amount of from about 29 to about 60 percent by volume of the ceramic composition;
inert filler particles having a $d_{50}$ of from about 5 μm to about 25 μm, in an amount of from about 8 to about 40 percent by volume of the ceramic composition; and
fumed silica particles, in an amount of up to about 15 percent by volume of the ceramic composition; and
curing the slurry composition to form the ceramic casting core.

13. The method of claim 12, wherein the platinum group metal catalyst is in an amount of from about 0.0035 to about 0.0075 percent by weight of the slurry composition.

14. The method of claim 12, wherein the dopant is in an amount of from about 0.075 to about 2.000 percent by weight of the ceramic composition.

15. The method of claim 12, wherein the slurry composition further comprises a dispersant.

16. The method of claim 12, wherein a combined volume of the fine fused silica particles and the coarse fused silica particles comprises at least 80 percent spherical particles.

17. The method of claim 12, wherein a combined volume of the fine fused silica particles and the coarse fused silica particles comprises at least 95 percent spherical particles.

18. The method of claim 12, wherein the inert filler particles are selected from the group consisting of zircon particles, aluminum oxide particles, quartz particles, and mixtures thereof.

19. The method of claim 12, wherein the binder comprises 1,3,5,7-tetravinyltetramethylcyclotetrasiloxane, methylhydrogenpolysiloxane, or a combination thereof.

20. The method of claim 12, wherein the dopant comprises an alkali metal cation source, an alkaline earth metal cation source, or a combination thereof.

21. The method of claim 12, wherein the dopant comprises an alkali metal borate, an alkali metal carbonate, an alkali metal oxide, an alkali metal silicate, an alkali metal hydroxide, an alkali metal nitrate, an alkaline earth metal carbonate, an alkaline earth metal oxide, an alkaline earth metal silicate, an alkaline earth metal nitrate, or a combination thereof.

22. The method of claim 12, wherein the dopant is a non-boron composition.

23. The method of claim 12, further comprising introducing the slurry composition into at least one internal cavity of a single-piece sacrificial die, wherein the die includes an external wall and the at least one internal cavity that correspond to features of a component.

24. The method of claim 23, further comprising removing the die by exposing the die to an environment adapted to destroy the die while leaving the ceramic casting core intact.

25. The method of claim 24, further comprising, subsequent to removing the die, performing an investment casting process using the ceramic casting core as part of a shell mold-core assembly to form the component.

* * * * *